(12) United States Patent
Saito et al.

(10) Patent No.: US 8,854,434 B2
(45) Date of Patent: Oct. 7, 2014

(54) TRANSMISSION DEVICE, RECEIVING DEVICE, PROGRAM, AND COMMUNICATION SYSTEM

(75) Inventors: Takehiko Saito, Kanagawa (JP); Ichiro Hamada, Tokyo (JP)

(73) Assignee: Sony Corporation (JP)

( * ) Notice: Subject to any disclaimer, the term of this patent is extended or adjusted under 35 U.S.C. 154(b) by 599 days.

(21) Appl. No.: 12/806,389

(22) Filed: Aug. 11, 2010

(65) Prior Publication Data
US 2011/0102554 A1    May 5, 2011

(30) Foreign Application Priority Data
Aug. 21, 2009  (JP) ............... P2009-192398

(51) Int. Cl.
| H04N 13/00 | (2006.01) |
| H04N 21/434 | (2011.01) |
| H04N 21/44 | (2011.01) |
| H04N 21/81 | (2011.01) |
| H04N 5/765 | (2006.01) |
| H04N 5/44 | (2011.01) |
| G09G 3/00 | (2006.01) |
| H04N 21/4363 | (2011.01) |
| G09G 5/00 | (2006.01) |

(52) U.S. Cl.
CPC ............ *H04N 5/44* (2013.01); *H04N 21/4347* (2013.01); *H04N 21/44* (2013.01); *G09G 2370/12* (2013.01); *H04N 21/816* (2013.01); *H04N 13/0059* (2013.01); *H04N 5/765* (2013.01); *H04N 13/0003* (2013.01); *G09G 5/003* (2013.01); *G09G 2370/047* (2013.01); *G09G 3/003* (2013.01); *G09G 5/006* (2013.01); *H04N 21/43635* (2013.01)

USPC .................. 348/51; 348/42; 348/43; 348/44; 348/45; 348/46; 348/47; 348/48; 348/49; 348/50; 348/52; 348/53; 348/54; 348/55; 348/56; 348/60

(58) Field of Classification Search
USPC ......... 348/42–60, 721; 341/50; 345/204, 419, 345/629; 382/154; 386/126; 375/140; 710/11
See application file for complete search history.

(56) References Cited

U.S. PATENT DOCUMENTS 4,862,270 A * 8/1989 Nishio ........................... 348/721
7,046,270 B2 * 5/2006 Murata et al. ................... 348/45

(Continued)

FOREIGN PATENT DOCUMENTS

| JP | 2005-006114 A | 1/2005 |
| JP | 2005-175566 A | 6/2005 |

(Continued)

OTHER PUBLICATIONS

High-Definition Multimedia Interface Specification Version 1.3a, Nov. 10, 2006, pp. ii-156 and Supplement 1 pp. i-97.

(Continued)

*Primary Examiner* — Dave Czekaj
*Assistant Examiner* — Shanika Brumfield
(74) *Attorney, Agent, or Firm* — Lerner, David, Littenberg, Krumholz & Mentlik, LLP

(57) ABSTRACT

There is provided a demultiplexer that receives video data for one of a three-dimensional display and a two-dimensional display. There is also provided an HDMI transmission portion that transmits the video data and display information that pertains to one of the three-dimensional display and the two-dimensional display of the video data to a television receiver through TMDS channels #0, #1, and #2 of an HDMI cable. There is also provided a transmission/receiving portion that transmits the display information to the television receiver through a CEC line of the HDMI cable.

21 Claims, 6 Drawing Sheets

(56) References Cited

U.S. PATENT DOCUMENTS

| | | | |
|---|---|---|---|
| 2004/0189795 A1* | 9/2004 | Ezawa | 348/51 |
| 2005/0030301 A1* | 2/2005 | Harrold et al. | 345/204 |
| 2005/0259147 A1* | 11/2005 | Nam et al. | 348/43 |
| 2006/0001554 A1* | 1/2006 | Morishita | 341/50 |
| 2006/0279750 A1* | 12/2006 | Ha | 358/1.2 |
| 2007/0002041 A1* | 1/2007 | Kim et al. | 345/419 |
| 2007/0097208 A1* | 5/2007 | Takemoto et al. | 348/46 |
| 2007/0165304 A1* | 7/2007 | Tomita | 359/464 |
| 2007/0242068 A1* | 10/2007 | Han et al. | 345/427 |
| 2008/0187028 A1* | 8/2008 | Lida | 375/140 |
| 2008/0303832 A1* | 12/2008 | Kim et al. | 345/501 |
| 2008/0309755 A1* | 12/2008 | Yoshida et al. | 348/51 |
| 2009/0013095 A1* | 1/2009 | Butcher | 710/11 |
| 2009/0033741 A1* | 2/2009 | Oh et al. | 348/51 |
| 2009/0051703 A1* | 2/2009 | Ikeda et al. | 345/629 |
| 2009/0185029 A1* | 7/2009 | Mitsuhashi et al. | 348/46 |
| 2009/0208191 A1* | 8/2009 | Imai et al. | 386/126 |
| 2010/0080448 A1* | 4/2010 | Tam et al. | 382/154 |

FOREIGN PATENT DOCUMENTS

| | | |
|---|---|---|
| JP | 2008-042645 A | 2/2008 |
| WO | 2009077929 A1 | 6/2009 |

OTHER PUBLICATIONS

European Search Report EP Application No. 10172746, dated Nov. 30, 2012.

* cited by examiner

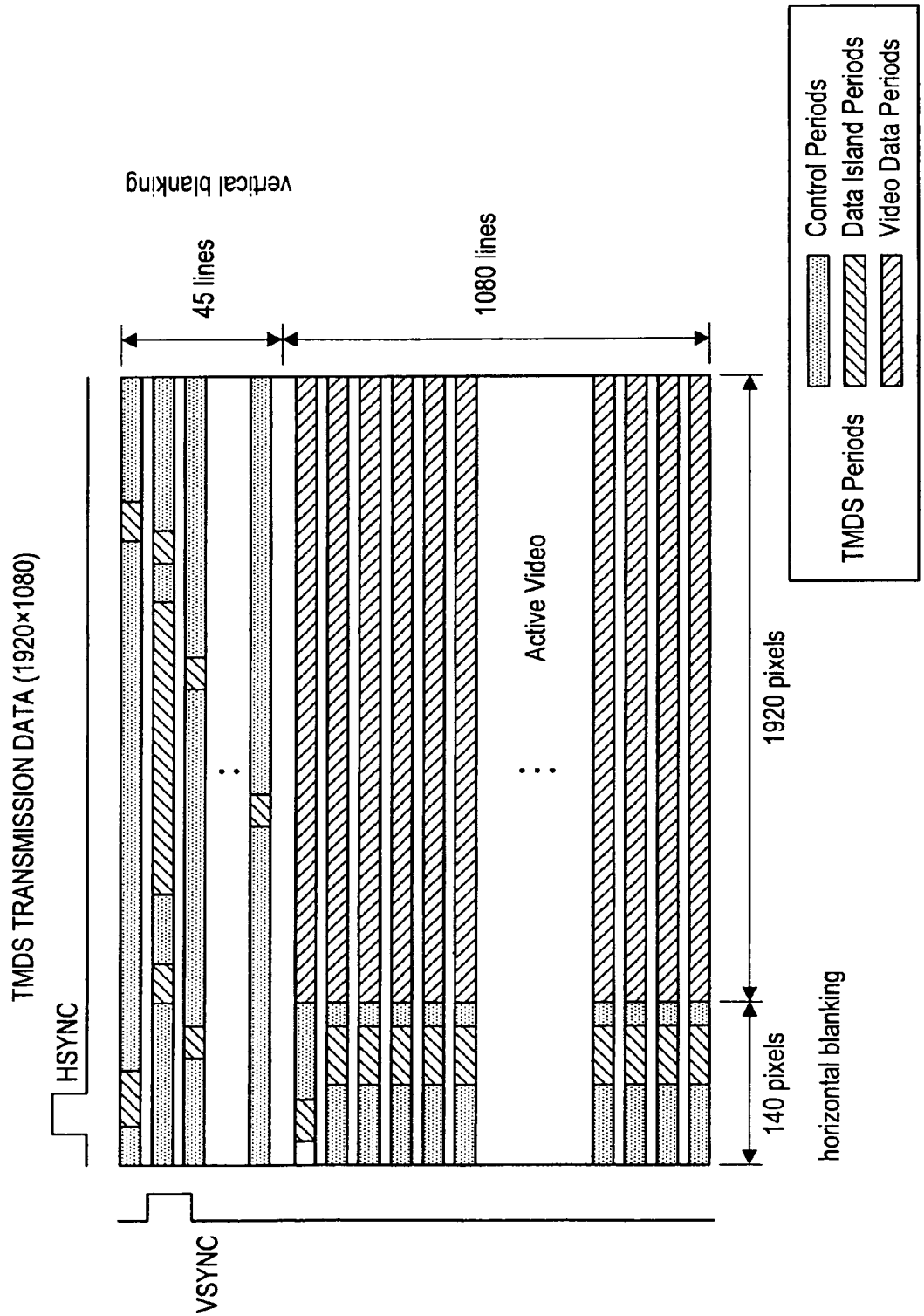

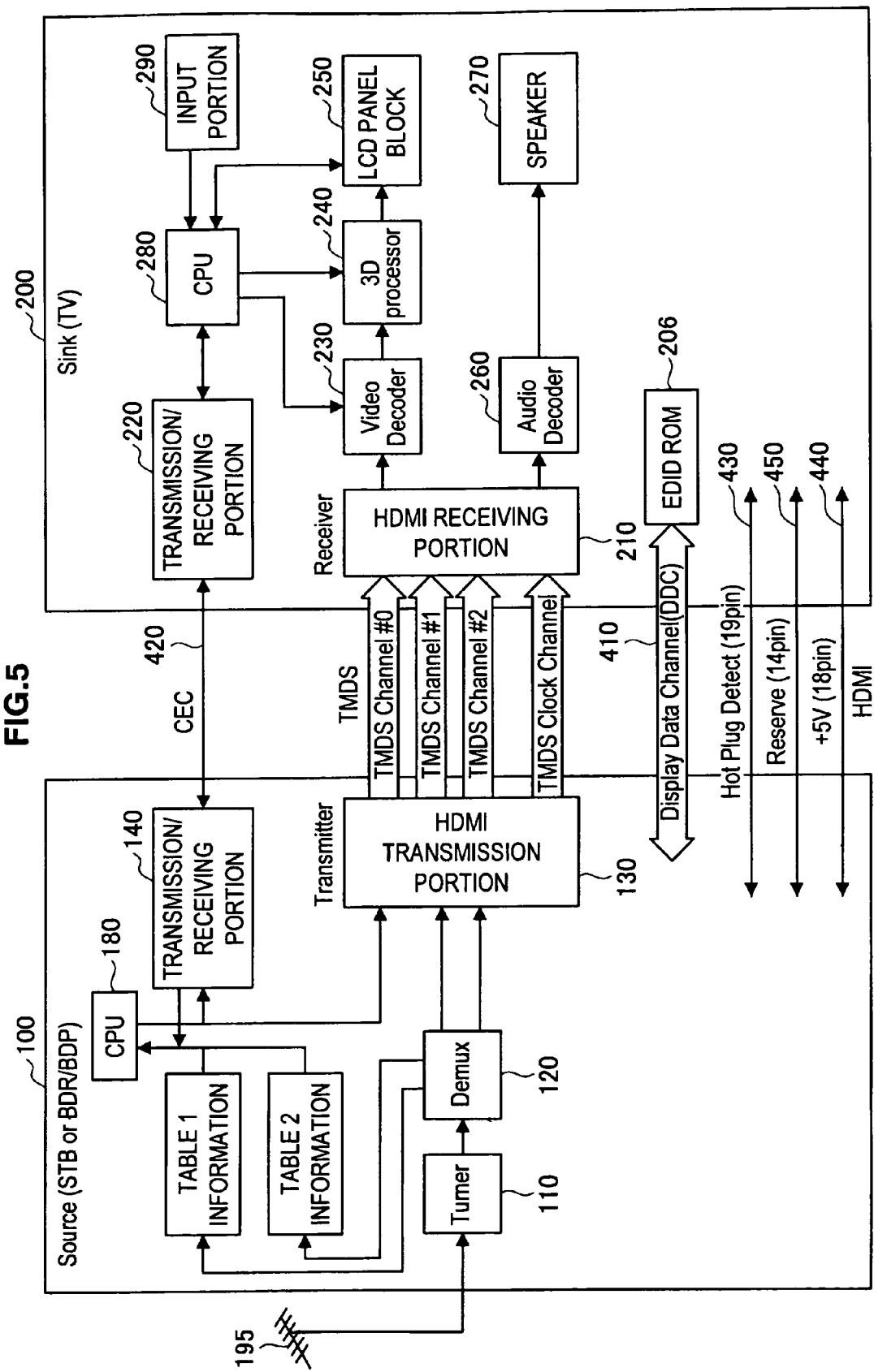

FIG.6

- CEA-861D (A DTV Profile for Uncompressed High Speed Digital Interface)
- http://www.ce.org

| InfoFrame Type Code | InfoFrame Type=02₁₆ | | | | | | |
|---|---|---|---|---|---|---|---|
| InfoFrame Version Number | Version=02₁₆ | | | | | | |
| Length of AVI InfoFrame | Length of AVI InfoFrame (13) | | | | | | |
| Data Byte 1 | F17=0 | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | F47=0 | VIC6 | VIC5 | VIC4 | VIC3 | VIC2 | VIC1 | VIC0 |
| Data Byte 5 | F57=0 | F56=0 | F55=0 | F54=0 | PR3 | PR2 | PR1 | PR0 |
| Data Byte 6 | Line Number of End of Top Bar (lower 8 bits) |
| Data Byte 7 | Line Number of End of Top Bar (upper 8 bits) |
| Data Byte 8 | Line Number of Start of Bottom Bar (lower 8 bits) |
| Data Byte 9 | Line Number of Start of Bottom Bar (upper 8 bits) |
| Data Byte 10 | Pixel Number of End of Left Bar (lower 8 bits) |
| Data Byte 11 | Pixel Number of End of Left Bar (upper 8 bits) |
| Data Byte 12 | Pixel Number of Start of Right Bar (lower 8 bits) |
| Data Byte 13 | Pixel Number of Start of Right Bar (upper 8 bits) |

Table 7 Auxiliary Video Information (AVI) InfoFrame Format (Version 2)

TRANSMISSION DEVICE, RECEIVING DEVICE, PROGRAM, AND COMMUNICATION SYSTEM

CROSS-REFERENCE TO RELATED APPLICATION

The present application claims priority from Japanese Patent Application No. JP 2009-192398 filed in the Japanese Patent Office on Aug. 21, 2009, the entire content of which is incorporated herein by reference.

BACKGROUND OF THE INVENTION

1. Field of the Invention

The present invention relates to a transmission device, a receiving device, a program, and a communication system.

2. Description of the Related Art

In Japanese Patent Application Publication No. JP-A-2008-042645, for example, a known technology is described that, in a case where stored images that include a mixture of two-dimensional and three-dimensional images are played back, determines whether the image that will be played back is two-dimensional or three-dimensional based on a control signal and displays the image in a manner that is appropriate for the output device. Further, as described in Japanese Patent Application Publication No. JP-A-2005-006114, a technology is known whereby, in a case where a three-dimensional image is included in a program, 3D-specific information is input in addition to program information, and an EMT is created.

Furthermore, in recent years, the High-Definition Multimedia Interface (HDMI) has come to be widely used as a communications interface that transmits, at high speed, from an audio-visual (AV) source such as a Digital Versatile Disc (DVD) recorder, a set-top box, or the like to a display such as a television receiver, a projector, or the like, a digital video signal, that is, an uncompressed (baseband) video signal (image data), and a digital audio signal (audio data) that is associated with the video signal. The HDMI standards are described in detail in the High-Definition Multimedia Interface Specification, Version 1.3a, Nov. 10, 2006, for example.

SUMMARY OF THE INVENTION

However, with the technologies that are described in the patent documents that are cited above, the signals that indicate the three-dimensional images are used by the device on the receiving side, but if only signals that indicate simply that the images are three-dimensional images are sent to the device on the receiving side, it is difficult to optimally control the display of the three-dimensional images and the two-dimensional images in accordance with the functions of the device on the receiving side.

Furthermore, even in a case where the HDMI standards or the like are used, a proposal for the transmission of three-dimensional image data has not been made, so even if the AV source on the receiving side receives the three-dimensional images through the HDMI or the like, the AV source on the receiving side cannot recognize that the images are three-dimensional images. A problem therefore arises in that operations cannot be performed on the receiving side that are appropriate for both the three-dimensional images and the two-dimensional images.

Accordingly, the present invention, in light of the problems that are described above, provides a transmission device, a receiving device, a program, and a communication system that are new and improved and that are capable of optimally displaying both the three-dimensional images and the two-dimensional images by transmitting and receiving between the devices, through an optimal transmission path, information that pertains to the three-dimensional images and the two-dimensional images.

In order to address the issues that are described above, according to an aspect of the present invention, there is provided a transmission device that includes a video signal receiving portion, a first transmission portion, and a second transmission portion. The video signal receiving portion receives video data for one of a three-dimensional display and a two-dimensional display. The first transmission portion transmits the video data and display information that pertains to one of the three-dimensional display and the two-dimensional display of the video data to a receiving device through a transmission path. The second transmission portion transmits the display information to the receiving device through a bidirectional communication path that is configured using a specified line of the transmission path.

The first transmission portion may also transmit the video data and the display information through the transmission path in the form of differential signals in a plurality of channels.

The first transmission portion may also transmit the display information to the receiving device by inserting the display information into a blanking interval in the video data.

The transmission device may also include a display information receiving portion that receives the display information from a digital broadcast signal that is transmitted from a broadcasting station, and the display information receiving portion may receive the display information from one of a system data area and a video data area of the digital broadcast signal.

The first transmission portion may also transmit to the receiving device the display information that the display information receiving portion has received from the video data area.

The second transmission portion may also transmit to the receiving device the display information that the display information receiving portion has received from the system data area.

The display information may also include one of information for switching between a three-dimensional image and a two-dimensional image, information for displaying a three-dimensional image as a two-dimensional image, information that pertains to one of timing for a switch from a three-dimensional image to a two-dimensional image and timing for a switch from a two-dimensional image to a three-dimensional image, and format information about a three-dimensional image format.

The transmission device may also include a receiving portion that receives from the receiving device a control signal that is input by a user, and the transmission device may also include a control portion that, based on the control signal, controls the video data that are transmitted from the first transmission portion.

The control portion may also switch the video data to one of a three-dimensional image and a two-dimensional image based on the control signal.

In a case where the video data are a three-dimensional image, the control portion may also modify a parallax between a left image and a right image based on the control signal.

In order to address the issues that are described above, according to another aspect of the present invention, there is provided a receiving device that includes a first receiving portion, a second receiving portion, and a control portion. The first receiving portion receives, from a transmission device that is connected to the receiving device through a transmission path, video data for one of a three-dimensional display and a two-dimensional display and display information that pertains to one of the three-dimensional display and the two-dimensional display of the video data. The second receiving portion receives the display information from the transmission device through a bidirectional communication path that is configured using a specified line of the transmission path. The control portion, based on the display information, controls video display processing in accordance with the video data.

The first receiving portion may also receive the video data and the display information through the transmission path in the form of differential signals in a plurality of channels.

The control portion may also include a decoder that decodes the video data, and the decoder may control decoding processing based on the display information that the first receiving portion has received along with the video data.

The display information may also include one of information for switching between a three-dimensional image and a two-dimensional image, information for displaying a three-dimensional image as a two-dimensional image, information that pertains to one of timing for a switch from a three-dimensional image to a two-dimensional image and timing for a switch from a two-dimensional image to a three-dimensional image, and format information about a three-dimensional image format.

The receiving device may also include an input portion through which a command is input by a user. The receiving device may also include a transmission portion that transmits, to the transmission device through the bidirectional communication path, a control signal in accordance with the command in order to control the transmission device.

The control signal may also be a signal for switching the video data in the transmission device to one of a three-dimensional image and a two-dimensional image.

The control signal may also be a signal for modifying a parallax between a left image and a right image in a case where the video data are a three-dimensional image.

In order to address the issues that are described above, according to another aspect of the present invention, there is provided a program that causes a computer to function as a portion that receives video data for one of a three-dimensional display and a two-dimensional display, a portion that transmits the video data and display information that pertains to one of the three-dimensional display and the two-dimensional display of the video data to a receiving device through a transmission path, and a portion that transmits the display information to the receiving device through a bidirectional communication path that is configured using a specified line of the transmission path.

In order to address the issues that are described above, according to another aspect of the present invention, there is provided a program that causes a computer to function as a portion that receives, from a transmission device that is connected to the computer through a transmission path, video data for one of a three-dimensional display and a two-dimensional display and display information that pertains to one of the three-dimensional display and the two-dimensional display of the video data, a portion that receives the display information from the transmission device through a bidirectional communication path that is configured using a specified line of the transmission path, and a portion that, based on the display information, controls video display processing in accordance with the video data.

In order to address the issues that are described above, according to another aspect of the present invention, there is provided a communication system that includes a transmission device and a receiving device. The transmission device includes a video signal receiving portion, a first transmission portion, and a second transmission portion. The video signal receiving portion receives video data for one of a three-dimensional display and a two-dimensional display. The first transmission portion transmits the video data and display information that pertains to one of the three-dimensional display and the two-dimensional display of the video data to a receiving device through a transmission path. The second transmission portion transmits the display information to the receiving device through a bidirectional communication path that is configured using a specified line of the transmission path. The receiving device includes a first receiving portion, a second receiving portion, and a control portion. The first receiving portion receives from the transmission device, to which the receiving device is connected through a transmission path, the video data and the display information that are transmitted from the first transmission portion. The second receiving portion receives from the transmission device, through the bidirectional communication path, the display information that is transmitted from the second transmission portion. The control portion, based on the display information, controls video display processing in accordance with the video data.

According to the present invention, it is possible to display optimally both the three-dimensional images and the two-dimensional images by transmitting and receiving between the devices, through an optimal transmission path, information that pertains to the three-dimensional images and the two-dimensional images.

BRIEF DESCRIPTION OF THE DRAWINGS

FIG. 4 is a schematic drawing that shows an example of a structure of TMDS transmission data;

FIG. 5 is a schematic drawing that shows an example of a system configuration according to a second embodiment; and FIG. 6 is a schematic drawing that shows a sixteen-byte data format that is called an AVI InfoFrame (prescribed by the CEA-861D standards).

DETAILED DESCRIPTION OF EMBODIMENT

Figure 1:
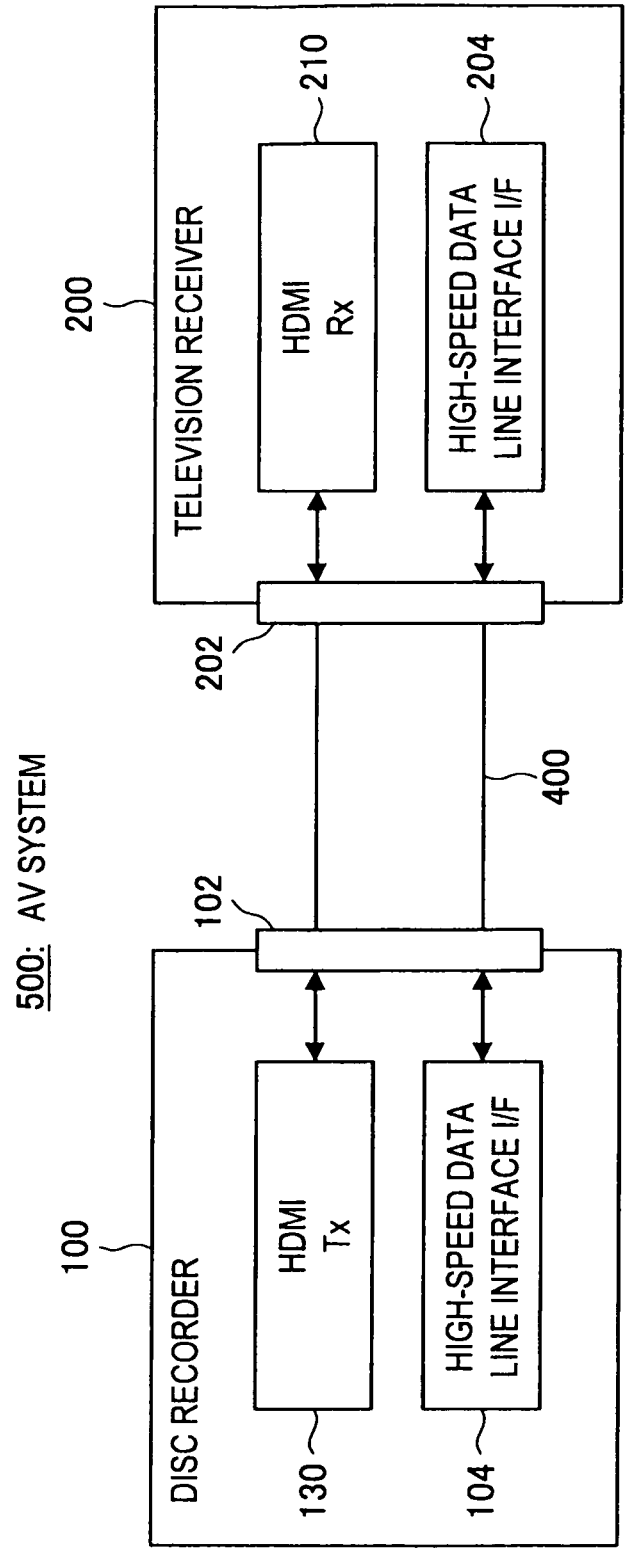
FIG. 1 is a schematic drawing that shows an example of a configuration of an audio-visual (AV) system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the explanation will be in the order shown below.
1. First embodiment
   (1) Presupposed technology
   (2) Configuration of system according to the present embodiment
   (3) Information about three-dimensional images
   (4) Processing in disc recorder
   (5) Processing in television receiver
   (6) Effect of inserting 3-D information
2. Second embodiment
   (1) Configuration of system according to the present embodiment 1. First Embodiment (1) Presupposed Technology In a case where digital broadcasting is performed, ordinarily the transport stream of H.222 ISO/IEC IS 13818-1, Information Technology—Generic Coding of Moving Pictures and Associated Audio Information: System is used to send the video, the audio, the EPG data, and the like, and a receiving device receives the video, the audio, the EPG data, and the like, separates them into the images, the sounds, and system data, and outputs the images and the sounds.

In a case where three-dimensional image content is displayed using the transport stream mechanism, information on the aspect ratio, the resolution, and the like of the video content can be sent within the transport stream mechanism, in accordance with the current standards. However, a mechanism does not exist for using the transport stream to send the three-dimensional image information.

On the receiving device side, the processing in a case where a three-dimensional image is received must be changed from what the processing is in a case where a two-dimensional image is received, but even if it is known that a three-dimensional image has been received, the receiving device cannot recognize that the image is three-dimensional. Therefore, on the receiving device side, even if the three-dimensional image data have been sent, a situation arises in which the processing that is appropriate for the three-dimensional image cannot be performed, and the displaying of the three-dimensional image cannot be performed properly. The system according to the present embodiment automatically determines whether the received image data are three-dimensional image data or two-dimensional image data and automatically performs control appropriately when the receiving device receives three-dimensional broadcast content.

(2) Configuration of System According to the Present Embodiment

FIG. 1 shows an example of a configuration of an audiovisual (AV) system 500 according to the present embodiment. The AV system 500 includes a disc recorder 100 as a source device and a television receiver 200 as a sink device.

The source device and the sink device are both user devices and may be disposed inside an ordinary residential home, for example. The source device receives, from a device at a broadcasting station, for example, a stream of program content or the like in a digital broadcast format and transmits the content to the sink device through an HDMI cable 400. In the present embodiment, the disc recorder 100, which is a Blu-Ray recorder, a Blu-Ray player, and the like, is used as an example of the source device, but the source device may also be a device such as a set-top box (STB) or the like. Furthermore, in the present embodiment, HDMI is used as an example of a communications interface that connects the source device and the sink device, but a communications interface such as a Mobile High-definition Link (MHL) or the like may also be used. In addition, in a case where the source device is a device such as a personal computer or the like, an interface such as a display board or the like may also be used.

The television receiver 200 that serves as the sink device is a device for watching and listening to content such as a television program that is received in the form of a digital broadcast signal, for example, and it displays the received images on a display screen and outputs the audio. The television receiver 200 is capable of receiving and displaying a three-dimensional image using the side-by-side method or the like, for example, as well as an ordinary two-dimensional image. Note that the method that is used for the three-dimensional image may also be a method other than the side-by-side method, as will be explained later.

The disc recorder 100 and the television receiver 200 are connected through the HDMI cable 400. An HDMI terminal 102, to which an HDMI transmission portion (HDMI Tx) 130 and a high-speed data line interface 104 are connected, is provided in the disc recorder 100. An HDMI terminal 202, to which an HDMI receiving portion (HDMI Rx) 210 and a high-speed data line interface 204 are connected, is provided in the television receiver 200. One end of the HDMI cable 400 is connected to the HDMI terminal 102 of the disc recorder 100, and the other end of the HDMI cable 400 is connected to the HDMI terminal 202 of the television receiver 200.

In the AV system 500 that is shown in FIG. 1, uncompressed (baseband) image data that are obtained by the disc recorder 100 are transmitted to the television receiver 200 through the HDMI cable 400. In the television receiver 200, images are displayed in accordance with the image data that were transmitted from the disc recorder 100. In addition, uncompressed audio data that are obtained by the disc recorder 100 are transmitted to the television receiver 200 through the HDMI cable 400, and in the television receiver 200, sounds are output in accordance with the audio data that were transmitted from the disc recorder 100.

Note that in a case where the image data that are transmitted from the disc recorder 100 are three-dimensional image data (stereoscopic image data) for displaying stereoscopic images, stereoscopic images are displayed by the television receiver 200 based on 3-D information that will be described later, in order to provide stereoscopic images to the user.

Figure 2:
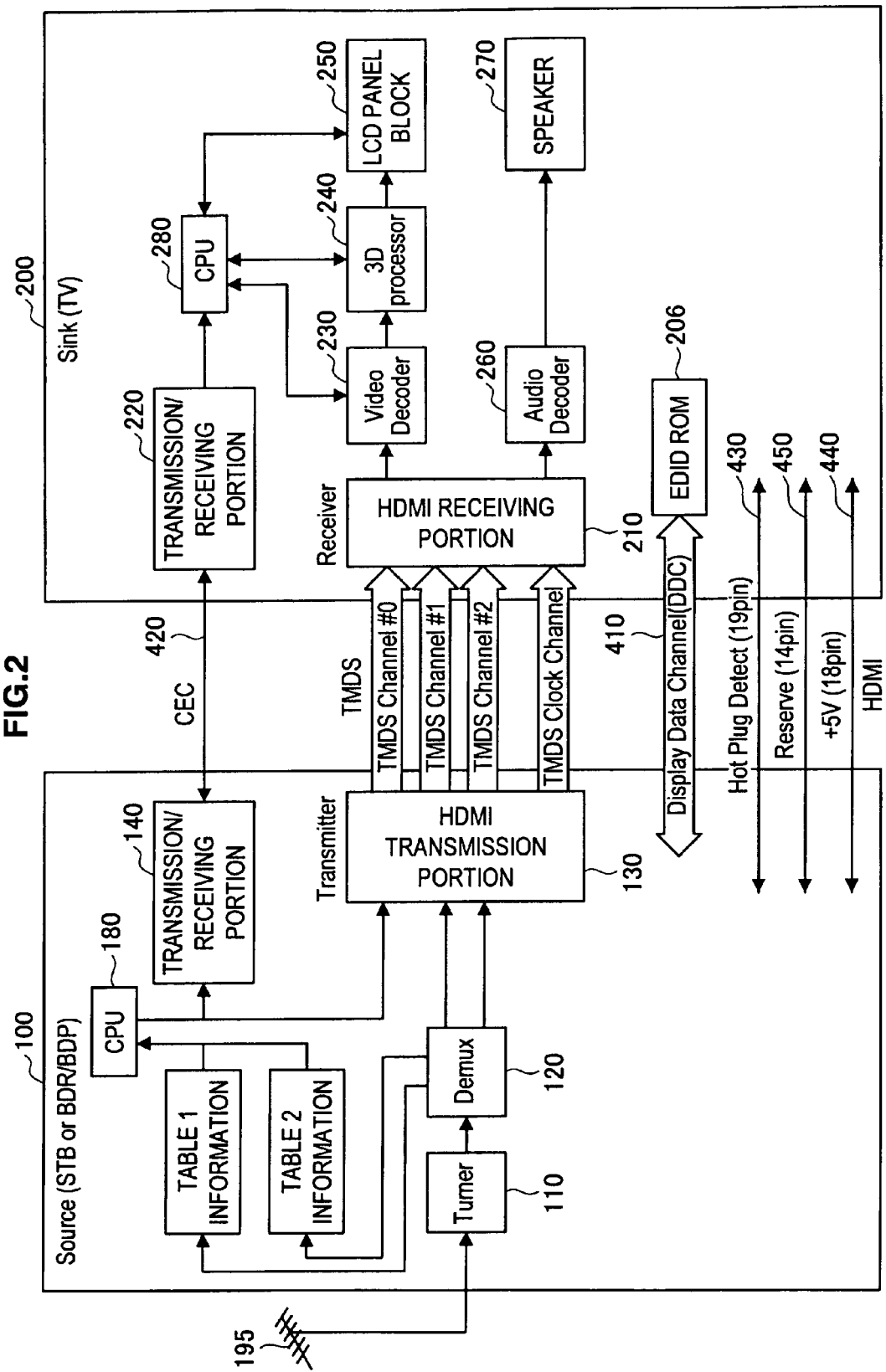
FIG. 2 is a schematic drawing that mainly shows an example of a configuration that relates to an HDMI transmission portion (an HDMI source) of a disc recorder and a configuration that relates to an HDMI receiving portion (an HDMI sink) of a television receiver in the AV system in FIG. 1.

FIG. 2 mainly shows an example of a configuration that relates to the HDMI transmission portion (the HDMI source) 130 of the disc recorder 100 and a configuration that relates to the HDMI receiving portion (the HDMI sink) 210 of the television receiver 200 in the AV system 500 in FIG. 1.

As shown in FIG. 2, the disc recorder 100 uses a tuner 110, a demultiplexer 120, and a Consumer Electronics Control (CEC) line 420 in addition to the HDMI transmission portion 130, and is provided with a transmission/receiving portion 140 that transmits and receives information to and from the television receiver 200, and is also provided with structural elements such as a CPU 180 and the like. An antenna 195 is also connected to the disc recorder 100 for receiving broadcast waves such as digital broadcast signals and the like from a device on the broadcasting station side (a transmission device 300 that will be described later).

In addition to the HDMI receiving portion 210, the television receiver 200 is provided with structural elements such as a transmission/receiving portion 220 that uses the CEC line 420 to transmit and receive information to and from the disc recorder 100, a video decoder 230, a 3-D processor 240, an LCD panel block 250, an audio decoder 260, a speaker 270, and the like. Note that each of the structural elements that are shown in FIG. 2 can be configured in the form of hardware (circuitry) and in the form of a central processing unit (a CPU) and a program (software) that causes the CPU to function.

During an effective image interval (hereinafter called the active video interval in some cases), which is an interval that is computed by subtracting a horizontal blanking interval and a vertical blanking interval from the interval from one vertical synchronizing signal to the next vertical synchronizing signal, the HDMI transmission portion 130 of the disc recorder 100 transmits to the HDMI receiving portion 210, in one direction over a plurality of channels, a differential signal that corresponds to the pixel data for one screen's worth of an uncompressed image. During one of the horizontal blanking interval and the vertical blanking interval, the HDMI transmission portion 130 transmits to the HDMI receiving portion 210, in one direction over a plurality of channels, a differential signal that corresponds to at least the audio data that is associated with the image, control data, other auxiliary data, and the like.

In other words, the HDMI transmission portion 130 converts the image data for the uncompressed image, for example, into the corresponding differential signal. The HDMI transmission portion 130 serially transmits the differential signals in one direction to the HDMI receiving portion 210 that is connected through the HDMI cable 400, using three Transition Minimized Differential Signaling (TMDS) channels #0, #1, and #2, which are the plurality of channels.

The HDMI transmission portion 130 also converts the audio data that is associated with the uncompressed image, as well as the necessary control data, other auxiliary data, and the like, into the corresponding differential signal and serially transmits the differential signals in one direction to the HDMI receiving portion 210 that is connected through the HDMI cable 400, using the three TMDS channels #0, #1, and #2.

The HDMI transmission portion 130 also uses a TMDS clock channel to transmit, to the HDMI receiving portion 210 that is connected through the HDMI cable 400, a pixel clock that is synchronized to the image data that are transmitted over the three TMDS channels #0, #1, and #2. In the present embodiment, ten bits of the image data are transmitted over any one TMDS channel i (where i=0, 1, or 2) during one clock interval of the pixel clock. Note that the transmission paths of the aforementioned TMDS channels #0, #1, and #2 and the TMDS clock channel are included in the HDMI cable 400.

During the active video interval, the HDMI receiving portion 210 receives the differential signal that corresponds to the image data and that was transmitted from the HDMI transmission portion 130 in one direction over the plurality of channels. During one of the horizontal blanking interval and the vertical blanking interval, the HDMI receiving portion 210 receives the differential signal that corresponds to the audio data and the control data and that was transmitted from the HDMI transmission portion 130 in one direction over the plurality of channels.

In other words, the HDMI receiving portion 210 receives, over the channels #0, #1, and #2, the differential signal that corresponds to the image data and the differential signal that corresponds to the audio data and the control data, both of the signals having been transmitted from the HDMI transmission portion 130 that is connected through the HDMI cable 400, and both of the signals being synchronized to the pixel clock that is transmitted over the TMDS clock channel.

Transmission channels that are called a Display Data Channel (DDC) 410 and the CEC line 420 are also provided, in addition to the HDMI transmission channels that are formed by the HDMI transmission portion 130 and the HDMI receiving portion 210, that is, the three TMDS channels #0 to #2 that serve as the transmission channels for serially transmitting the image data and the audio data from the HDMI transmission portion 130 to the HDMI receiving portion 210 in synchronization with the pixel clock and the TMDS clock channel that serves as the transmission channel that transmits the pixel clock.

The DDC 410 is included in the HDMI cable 400 and includes two signal lines that are not shown in the drawings. The DDC 410 is used by the HDMI transmission portion 130 to read enhanced extended display identification data (E-EDID) from the HDMI receiving portion 210 that is connected through the HDMI cable 400.

Specifically, the television receiver 200 has an EDID read only memory (ROM) 206 that stores the E-EDD, which is configuration/capability information that pertains to the configuration/capability of the television receiver 200. The disc recorder 100, in response to a request from the CPU 180, for example, reads the E-EDID that is the configuration/capability information for the television receiver 200, reading the E-EDID through the DDC 410 from the EDID ROM 206 that is connected through the HDMI cable 400. The HDMI transmission portion 130 sends the E-EDID that has been read to the CPU 180. The CPU 180 stores the E-EDID in one of a flash ROM and a DRAM (not shown in the drawings) that are provided in the disc recorder 100.

The CPU 180 can recognize the configuration/capability settings of the HDMI receiving portion 210 based on the E-EDID. For example, based on the E-EDID, the CPU 180 recognizes the image format (profile) with which the television receiver 200 that has the HDMI receiving portion 210 is compatible, such as RGB, YCbCr 4:4:4, YCbCr 4:2:2, or the like. Based on three-dimensional image data transmission method information that is included in the E-EDID, the CPU 180 also recognizes the transmission method for the three-dimensional image data and the audio data with which the television receiver 200 that has the HDMI receiving portion 210 is compatible.

The CEC line 420 is a single signal line that is included in the HDMI cable 400, but is not shown in the drawings. The CEC line 420 is used to perform two-way communication of control data between the HDMI transmission portion 130 and the HDMI receiving portion 210. For example, in a case such as where the power supply to the disc recorder 100 is turned on, the power supply to the television receiver 200 can also be turned on in conjunction with that by sending a control signal from the disc recorder 100 to the television receiver 200 through the CEC line 420. In the present embodiment, the CEC line 420 is also used for transmitting adaptation field 3-D information, which will be described later.

A line (a Hot Plug Detect (HPD) line) 430 that is connected to a pin that is called an HPD is also included in the HDMI cable 400. The line 430 can be used by the source device to detect that the sink device is connected. A line 440 that is used for supplying electric power from the source device to the sink device is also included in the HDMI cable 400. A reserve line 450 is also included in the HDMI cable 400.

Figure 3:
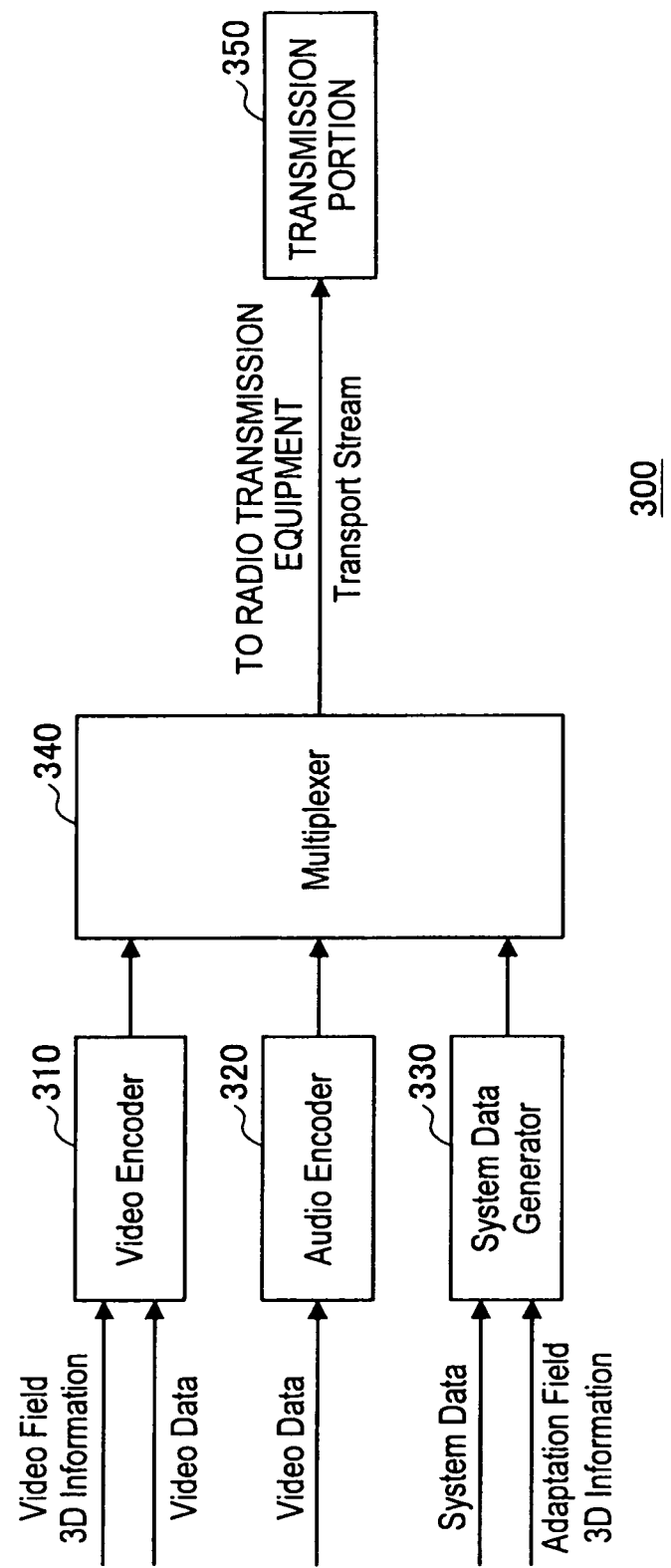
FIG. 3 is a schematic drawing that shows a configuration of a transmission device in a broadcasting station according to an embodiment of the present invention.

FIG. 3 is a schematic drawing that shows a configuration of the transmission device 300 according to the present embodiment. The transmission device 300 is a device on the broadcasting station side and it uses digital broadcast signals to transmit program content, information that is related to the program content, and the like to the disc recorder 100. The transmission device 300 can transmit the three-dimensional images that are described above, for example, as well as the ordinary two-dimensional images, to the disc recorder 100. As shown in FIG. 3, the transmission device 300 is provided with a video encoder 310, an audio encoder 320, a system data generator 330, a multiplexer 340, and a transmission portion 350.

The disc recorder 100 that is shown in FIG. 1 and the transmission device 300 that is shown in FIG. 3 are connected by one of a wired connection and a wireless connection. In a case where the program content that is being transmitted is three-dimensional, the transmission device 300 transmits information (the 3-D information) that pertains to the three-dimensional images, along with the video signal, the audio signal, the EPG information, and the like. The disc recorder 100 takes the 3-D information that is sent from the transmission device 300 and transmits it along with the video signal to the television receiver 200 through one of the CEC line 420 and the TMDS channels #0, #1, and #2. The television receiver 200 controls its own various functions based on the 3-D information.

(3) Information about Three-dimensional Images

Hereinafter, the information that pertains to the three-dimensional images and that is transmitted from the transmission device 300 will be explained in detail. Typical information that pertains to the three-dimensional images may include the information that is listed below, for example. In the system according to the present embodiment, many types of information, including the information that has been described above, are inserted into the format of the digital broadcast signal and are transmitted from the transmission device 300 to the disc recorder 100. Receiving this sort of information from the disc recorder 100 makes it possible for the television receiver 200 to display both the three-dimensional images and the two-dimensional images properly, and even in a case where the images are switched between two-dimensional images and three-dimensional images, the television receiver 200 can display both the three-dimensional images and the two-dimensional images properly in accordance with the switching.

1. Information that pertains to the format of the three-dimensional images

2. Information that pertains to a switching point (the switching timing) when a switch is made from the standard format (the two-dimensional images) to the three-dimensional images and when a switch is made from three-dimensional images to the standard format (the two-dimensional images).

3. Information that pertains to the images to be displayed when three-dimensional content that is transmitted in the form of three-dimensional images is displayed in the form of two-dimensional images by the television receiver 200.

In the present embodiment, the 3-D information is inserted into two different places in the digital broadcast data in order to transmit the information that pertains to the three-dimensional images from the transmission device 300 to the disc recorder 100. The first place where the information is inserted is a system data area (hereinafter called the first area in some cases), and it can be one of an adaptation field and a PES packet of the transport stream that is defined by H.222 ISO/IEC IS 13818-1, Information Technology—Generic Coding of Moving Picture and Associated Audio Information: System. More specifically, a transport_private_data_flag that is defined by the transport stream adaptation field can be set, after which a transport_private_data area can be defined, and the information can be inserted into the transport_private_data area. In addition, a PES extension flag that is defined by the PES packet can be set, after which a PES extension can be defined and a PES private data flag that is defined within the PES extension can be set, after which a PES private data area can be defined, and the information can be inserted into the PES private data area.

One more place where the information is inserted is a video data area (hereinafter called the second area in some cases). For example, in a case where the information is inserted into an MPEG2 video (H.222 ISO/IEC IS 13818-1, Information Technology—Generic Coding of Moving Picture and Associated Audio Information: Video), the information can be inserted into a user data area of a picture header that is defined by the same format. The data that pertain to the three-dimensional images may also be inserted into a sequence header, a slice header, and a macro block header.

Note that the times when the data that pertain to the three-dimensional images are inserted are limited to cases where three-dimensional content will be displayed, and the information is not inserted in a case where two-dimensional content will be displayed. Therefore, in a case where the data that pertain to the three-dimensional images have not been inserted into the digital broadcast signal data in either the disc recorder 100 or the television receiver 200, the image data that are received can be recognized as being two-dimensional image data.

The information that is inserted into the first area is inserted into the system data in the system data generator 330 of the transmission device 300. The information that is inserted into the second area is inserted into the video data in the video encoder 310 of the transmission device 300. The multiplexer 340 of the transmission device 300 generates the transport stream of the digital broadcast signal from the system data that are input from the system data generator 330, the video data that are input from the video encoder 310, and the audio data that are input from the audio encoder 320, then sends the transport stream to the transmission portion 350.

In the disc recorder 100, the information that was inserted into the first area and the information that was inserted into the second area are both extracted by the demultiplexer 120 and are sent to the CPU 180. The CPU 180 transmits the extracted information to the television receiver 200 through the HDMI cable 400 and the CEC line 420. At this time, the 3-D information that was inserted into the first area is mainly transmitted to the television receiver 200 through the CEC line 420, based on a command from the CPU 180. Further, the 3-D information that was inserted into the second area is transmitted to the television receiver 200 through the TMDS channels #0, #1, and #2, along with the video data. In a case where the 3-D video signal is transmitted in a format that is not prescribed by HDMI, the disc recorder 100 transmits that information to the television receiver 200 through the CEC line 420. Thus, the present embodiment is configured such that the information in a case where the three-dimensional images and the two-dimensional images are switched instantaneously (the information in Table 2 and the like) is transmitted in packets through the TMDS channels, and the information in a case where a comparatively long time is required for the transition and the information that does not need to be switched frequently (the information in Table 1 and the like) are transmitted through the CEC line 420.

The television receiver 200 controls various functions based on the 3-D information that is transmitted from the disc recorder 100. The 3-D information that is received through the CEC line 420 is received by the video decoder 230 and is used for controlling the functions of the television receiver 200. The 3-D information that is received through the CEC line 420 is also sent to the 3-D processor 240 for controlling the functions of the 3-D processor 240.

Hereinafter, the information that is inserted into the first area and the second area in the transmission device 300 will be explained in detail. The information that is inserted into the transport_private_data area that serves as the first area will be explained first. The 3-D information (the three-dimensional information) that is shown below is the 3-D information that is inserted into the transport_private_data area and is inserted into the adaptation field 3-D information. In the transmission device 300, the adaptation field 3-D information is input to the system data generator 330, is input to the multiplexer 340 along with the system data, and is sent in the form of the transport stream to radio transmission equipment.

TABLE 1

Contents of the adaptation field 3-D information

```
three_dimensional information ( ) {
    information_id                              8  bslbf
    data_length                                 8  uimsbf
    reserved                                    3  bslbf
    version_number                              5  bslbf
    three_dimension_format                      8  bslbf
    three_dimension_sub_format                  8  bslbf
    default_picture                             3  bslbf
    display_control                             3  bslbf
    transition_flag                             1  bslbf
    format_dependent_flag                       1  bslbf
    if (transition_flag==1) {
        transition_type                         2  bslbf
        transition_timing                       3  bslbf
        if (transition_timing==0x01) {
            transition_time                    11  uimsbf
        }
        else {
            reserved                           11  bslbf
        }
    }
    else {
        reserved                               16  bslbf
    }
    if (format_dependent_flag==1) {
        for (i=0;i<N;i++) {
            format_dependent_data_byte          8  bslbf
        }
    }
}
```

Hereinafter, the adaptation field 3-D information will be explained in detail. The three_dimensional_information is the information that pertains to the three-dimensional display, and it includes the following information:
information_id
data_length
reserved
version_number
three_dimension_format
three_dimension_sub_format
default_picture, display_control
transition_flag, format_dependent_flag Note that in some cases, information other than the three_dimensional_information is included in the adaptation field 3-D information, so in the present embodiment, the three_dimensional_information is defined as the 3-D information within the adaptation field 3-D information.

The information_id is identification information, and it is an ID that indicates that the information that is recorded in the adaptation field 3-D information is the 3-D information (the three_dimensional_information). The data_length is information that indicates the length (the number of bytes) of the data that follow the data_length, and it is information that indicates the number of bytes of the three_dimensional_information. The reserved line specifies a spare data field.

The version_number indicates the version number of the 3-D information. The adaptation field 3-D information that is shown in Table 1 may be transmitted from the transmission device 300 to the disc recorder 100 with a frequency of several times per second, for example. The version_number is incremented by one every time that the content of the information in Table 1, that is, the three_dimensional_information, is changed. In a case where the version_number is the same as was transmitted in the previous round, the transmitted 3-D information is the same as in the previous round. In the disc recorder 100, in a case where the newly received 3-D information has the same version number as the 3-D information that was received in the previous round, the 3-D information has already been received, so the newly received 3-D information is ignored. When the version number reaches 31, the version number reverts to zero.

The three_dimension_format is information that indicates the three-dimensional image format that was mentioned above, and it is defined as shown below.

| | |
|---|---|
| 0x00 | side by side |
| 0x01 | Frame packing |
| 0x02 | Line alternative |
| 0x03 | Field alternative |
| 0x04-ff | reserved |

In a case where the three_dimension_format is 0x00, it indicates that the three-dimensional image format is the side-by-side format. The side-by-side format is a format in which a single ordinary screen is divided into two parts, left and right. A display signal for a left eye image L on the left side and a display signal for a right eye image R on the right side are transmitted, and the disc recorder 100 separates the two images and enlarges each of the images in the horizontal direction. As shown above, the three-dimensional image format can also be designated to be the frame packing format, the line alternative format, the field alternative format, and the like.

The three_dimension_sub_format is information that indicates differences in the formats of the individual three-dimensional images that are defined by the three_dimension_format, such as resolution, data transmission speed, and the like. for example, in a case where the side-by-side format (0x00) is used, the three_dimension_sub_format is defined as shown in below.

| | three_dimension_sub_format (if three_dimension_format==0x00) |
|---|---|
| 0x00 | half resolution, Left picture for Left |
| 0x01 | half resolution, Right picture for Left |
| 0x02 | full resolution, Left picture for Left |
| 0x03 | full resolution, Right picture for Left |
| 0x04-ff | reserved_future_use |

The default_picture is information that designates which of the left image and the right image will be displayed in accordance with a three-dimensional image will be displayed as a two-dimensional image by the receiving device. In the case of the side-by-side format, for example, the default_picture is defined as shown below.

| | |
|---|---|
| 0x00 | not defined |
| 0x01 | left picture |
| 0x02 | right picture |
| 0x03-07 | reserved |

In the example that is described above, in a case where the default_picture is set to 0x01, the television receiver 200, having received the three-dimensional image in the side-by-side format, displays the image using only the left eye image (the left picture). This makes it possible for the television receiver 200 to perform the display of a two-dimensional image in a case where a three-dimensional image has been received.

The display_control is information for prescribing the display format while the three-dimensional content is being displayed, and where two-dimensional superimposed characters (superimposed captions) or the like are inserted while the three-dimensional content is being displayed, the display_control is used for the purpose of avoiding a situation where the character data is made hard to see by being displayed three-dimensionally. The display_control may be defined as shown below, for example.

| display_control | |
| --- | --- |
| 0x00 | no requirement for display control. |
| 0x01 | 2D display is required even in 3D video appears. |
| 0x02 | 2D display is preferred |
| 0x03-07 | reserved |

The transition_flag is information that indicates a switch from two-dimensional images to three-dimensional images and a switch from three-dimensional images to two-dimensional images. The transition_flag is defined as shown below, such that when the transition_flag is "0", the switching is not performed and when the transition_flag is "1", the switching is performed.

| Transition_flag | |
| --- | --- |
| 0 | Transition not activated |
| 1 | Transition activated |

The format_dependent_flag is a flag that indicates whether or not additional information is included, and in a case where the format_dependent_flag is "1", it indicates that the additional information is present in the adaptation field 3-D information. On the other hand, in a case where the format_dependent_flag is "0", it indicates that the additional information is not present in the adaptation field 3-D information. Setting the format_dependent_flag to "1" makes it possible to insert the additional information in accordance with the three-dimensional image format.

When the transition_flag is "1", information is indicated by the transition_type and the transition_timing. The transition_type may be defined as one of four different values, in the following format:

transition_type

0x00

Initially, as well as when the display is set to the two-dimensional mode, 0x00 indicates that a transition from 2-D to 3-D will occur. When the display is set to the three-dimensional mode, 0x00 indicates that a transition from 3-D to 2-D will occur. In this case, the transition timing applies only to the switch from 2-D to 3-D. the transition from 3-D to 2-D can be used in a case where a rapid transition is required.

| 0x01 | indicates transition from 3-D to 2-D |
| --- | --- |
| 0x02 | indicates transition from 2-D to 3-D |
| 0x03 | reserved |

The transition_timing is information that indicates the time remaining until the switch (the transition), and it may be defined as shown below, for example.

| transition_timing | |
| --- | --- |
| 0x00 | immediate transition |
| 0x01 | transition will happen after specified time |
| 0x02 | transition will happen after 500 milliseconds |
| 0x03 | transition will happen after 1 second |
| 0x04 | transition will happen after 2 seconds |
| 0x05-07 | reserved future_use |

In the examples that are shown above, when the transition_timing is 0x00, the transition is performed immediately, and when the transition_timing is 0x01, the transition is performed after a specified period of time elapses. When the transition_timing is 0x02, the transition is performed after 500 milliseconds. When the transition_timing is 0x03, the transition is performed after one second, and when the transition_timing is 0x04, the transition is performed after two seconds. The transition_timing values 0x05 to 0x07 are set as reserved data areas.

Further, when the transition_timing is 0x01, the time after which the transition will occur (the transition_time) is defined by the data 11 uimsbf, in which the numerical value that is defined in the data corresponds to the time (in milliseconds) until the transition will occur. The transition_time is represented by eleven bits of data, so maximum time that can be designated is 2048 milliseconds. In a case where the transition_timing is not 0x01, the reserved data area is set to 11 bslbf. When the transition_flag is "0", the reserved data area is set to 16 bslbf.

An absolute time Program Clock Reference (PCR) may also be used as the transition_timing. In that case, when the transition_flag is "1" in the adaptation field 3-D information described above, the data structure is as shown below.

```
if (transition_timing==0x01) {
    reserved                2 bslbf
    transition_time        33 uimsbf
}
else {
    reserved               35 bslbf
}
```

In this case, when the transition_flag is "1", the reserved data area is maintained at 2 bslbf, and the transition_time is indicated as the absolute time PCR by the data 33 uimsbf. In this case, the twelve bits of Table 1 are expanded to 36 bits, and in the program clock reference base format that is prescribed by H.222 ISO/IEC IS 13818-1, Information Technology—Generic Coding of Moving Pictures and Associated Audio Information: System, it is possible to transmit the absolute value for the transition time by inserting the transition time value.

In addition, in a case where the format_dependent_flag is "1", the remainder of the data length is prescribed by the format_dependent_data_byte (8 bslbf), and information that it is considered desirable to add can be inserted in accordance with the three-dimensional image format.

In the adaptation field 3-D information that has been explained above, the transport_private_data_flag is set that is defined by the transport stream adaptation field that is defined by H.222 ISO/IEC IS 13818-1, Information Technology—Generic Coding of Moving Pictures and Associated Audio Information: System, after which the 3-D information is inserted by inserting the information in Table 1 into the defined transport_private_data area. The PES extension flag is set in the PES packet that is defined by the same standards, and the PES private data flag is set that is defined in the PES extension, after which the information can be inserted into the defined PES private data area. However, in this case, the private data area is fixed at 128 bits, so the first 400 bits of the Table 1 information are inserted, and the remaining 88 bits are treated as reserved data.

In a case where the 3-D information is inserted into the first area as explained above, the information is inserted into the system data area, so the transmission device 300 is able to freely insert the 3-D information that is necessary for editing the television program at any time. It is therefore possible for urgent information, in the form of the superimposed characters described earlier, to be inserted as necessary and for the character information to be displayed appropriately by the receiving device. In the television receiver 200, the 3-D information that has been inserted into the first area is information that is processed by a system layer (a demultiplexer layer), and the processing is mainly carried out by the CPU 180, based on the information.

To give an example of the information that is inserted into the first area, in a case where the program content is sixty minutes' worth of three-dimensional images, for example, information to the effect that three-dimensional images will be transmitted for the next sixty minutes might be inserted at the beginning of the program. In a case where the television receiver 200 has received this sort of information, it can recognize that it will be receiving the three-dimensional images for the next sixty minutes. Therefore, in this case, it is not necessary to insert information to the effect that the images are three-dimensional images into every frame of the video data, so the volume of information can be reduced.

Next, the information that is inserted into the video data area will be explained. In a case where the information is inserted into an MPEG2 video, the information that is shown below is information (video field 3-D information) that is inserted into the user data area of the picture header that is defined by the same format. In the transmission device 300, the video field 3-D information is input to the video encoder 310, is input to the multiplexer 340, and is sent in the form of the transport stream to the radio transmission equipment.

TABLE 2

Contents of the video field 3-D information

| three_dimensional_information ( ) { | |
|---|---|
| information_id | 8 bslbf |
| data_length | 8 umisbf |
| three_dimension_format | 8 bslbf |
| three_dimension_sub_format | 8 bslbf |
| default_picture | 2 bslbf |
| reserved | 6 bslbf |
| } | |

In the video field 3-D information, the information that is indicated by the information_id, the data_length, the three_dimension_format, the three_dimension_sub_format, the default_picture, and the reserved data is the same as in the adaptation field 3-D information. However, some of the bit assignments are different.

The video field 3-D information is inserted into the video data area. For example, in a case where the information is inserted into an MPEG2 video (H.222 ISO/IEC IS 13818-1, Information Technology—Generic Coding of Moving Picture and Associated Audio Information: Video), the information can be inserted into the user data area of the picture header (I picture, P picture, B picture) that is defined by the same format. Note that the information in Table 2 can also be inserted into the user data area of the sequence header (the header at the beginning of the Group of Picture (GOP)) that is defined by the same format. The information can also be inserted into the user data area of the slice header and the user data area of the macro block header.

The 3-D information in Table 2 is sent along with the video data from the demultiplexer 120 to the HDMI transmission portion 130, and based on a command from the CPU 180, it is sent to the HDMI receiving portion 210 and the video decoder 230 of the television receiver 200 through the TMDS channels #0, #1, and #2. The video field 3-D information is inserted only into a three-dimensional video and is not inserted into an ordinary (two-dimensional) video signal, so based on the 3-D information in Table 2, the video decoder 230 can automatically and instantaneously perform the switch from the three-dimensional decoding processing to the two-dimensional decoding processing and can automatically and instantaneously perform the switch from the two-dimensional decoding processing to the three-dimensional decoding processing. The video decoder 230 also instantaneously switches the decoding processing in accordance with the three-dimensional image format that is included in the three_dimension_format and the three_dimension_sub_format. Therefore, the 3-D information in Table 2 is particularly useful in the television receiver 200 that can instantaneously perform the switching of the display between 3-D and 2-D. Note that because the 3-D information in Table 2 is inserted by the video encoder 310 of the transmission device 300 at the time that the video data are created, it is preferable for information that is added after the broadcast program is edited, such as the character data described above and the like, to be inserted into the information in Table 1.

In addition, the information that is inserted into the second area may be information that identifies whether the video data for the current frame is three-dimensional video data or two-dimensional video data. By receiving this information for every frame, the television receiver 200 can instantaneously determine whether the current frame that is being received is a three-dimensional image or a two-dimensional image.

(4) Processing in Disc Recorder

As explained above, the information that pertains to the three-dimensional images is inserted into the transport stream in two locations, and the video is sent from the transmission device 300 to the disc recorder 100 with that state in effect. In the disc recorder 100, the information that pertains to the three-dimensional images is extracted, and the information that is extracted from the first area is sent to the television receiver 200 using mainly the CEC line 420. The disc recorder 100 sends the information that is extracted from the second area to the thread spool 20 using mainly the TMDS channels #0, #1, and #2.

As shown in FIG. 2, the MPEG2 transport stream is received by the antenna 195, and the frequency is selected by the tuner 110, after which the transport stream is processed by a demodulator and converted into the transport stream, then sent to the demultiplexer 120. The demultiplexer 120 detects the information in Table 1 (the adaptation field 3-D information) and separates it from the transport stream. Based on a command from the CPU 180, the adaptation field 3-D information is sent from the transmission/receiving portion 140 to the television receiver 200 through the CEC line 420. Note that it is possible to use an alternative to the CEC line 420, such as Ethernet or the like (eHDMI, HEC).

The demultiplexer 120 extracts the information in Table 2 (the video field 3-D information) that is included in the video data in the transport stream. Based on a command from the CPU 180, the information in Table 2 is adjusted to the format of TMDS transmission data and is transmitted along with the video signal to the television receiver 200 using the TMDS channels #0, #1, and #2.

FIG. 4 shows an example of the structure of the TMDS transmission data. FIG. 4 shows the intervals of various types of transmission data in a case where image data having 1920 pixels in each of 1080 lines are transmitted through the TMDS channels #0, #1, and #2.

In the video field in which the transmission data are transmitted in the three HDMI TMDS channels #0, #1, and #2, three types of intervals exist in accordance with the types of the transmission data. The three types of intervals are a Video Data Period, a Data Island Period, and a Control Period.

In the present embodiment, a video field interval is the interval from the active edge of one vertical synchronizing signal to the active edge of the next vertical synchronizing signal. The video field interval is divided into the horizontal blanking interval, the vertical blanking interval, and the active video interval, which is the interval that is computed by subtracting the horizontal blanking interval and the vertical blanking interval from the video field interval.

The Video Data Period is allocated in the active video interval. Active pixel data for the 1920 pixels in each of the 1080 lines, which constitute one screen's worth of uncompressed image data, are transmitted in the Video Data Period.

The Data Island Period and the Control Period are allocated in the horizontal blanking interval and the vertical blanking interval. The auxiliary data are transmitted in the Data Island Period and the Control Period. Specifically, the Data Island Period is allocated to portions of the horizontal blanking interval and the vertical blanking interval. Data that are not related to control, such as audio data packets and the like, are transmitted within the auxiliary data during the Data Island Period.

The Control Period is allocated to other portions of the horizontal blanking interval and the vertical blanking interval. Data that are related to control, such as the vertical synchronizing signal, a horizontal synchronizing signal, a control packet, and the like, are transmitted within the auxiliary data during the Control Period.

In the present embodiment, the 3-D information that is extracted from the second area as described above can be adjusted to the format of TMDS transmission data and inserted into the Control Period under the control of the CPU 180. The 3-D information that is extracted from the second area can also be inserted into the Data Island Period. In that case, the 3-D information that is extracted from the second area can be inserted as identification information by setting a flag in a packet that is called an InfoFrame. In the HDMI packet, sixteen-byte information that is called the AVI InfoFrame (prescribed by CEA-861D), which is shown in FIG. 6, for example, is mapped into an InfoFrame packet that is transmitted by TMDS. The InfoFrame packet is transmitted during the Data Island Period. In addition, in HDMI, there is an InfoFrame packet that is called a Vendor-Specific InfoFrame and that can be defined and used by the individual vendor. The 3-D information that is described above (including the side-by-side and the top-and-bottom structures, the identification flags for the left and right screens, and the like) can be transmitted by HDMI by setting specific bits that are defined by the Vendor-Specific InfoFrame, for example.

Under the control of the CPU 180, the timing of the 3-D information that is extracted from the second area is adjusted according to the timing that is prescribed for the format of the TMDS transmission data, and the 3-D information is then inserted into one of the Control Period and the Data Island Period. The differential signals that correspond to the image data and to the 3-D information that is extracted from the second area are thus transmitted by the HDMI transmission portion 130 to the HDMI receiving portion 210 in one direction through the plurality of the channels #0, #1, and #2.

(5) Processing in Television Receiver

The HDMI receiving portion 210 of the television receiver 200 has three recovery decoders that respectively correspond to the three TMDS channels #0, #1, and #2. The recovery decoders respectively receive the image data, the auxiliary data, and the control data that have been transmitted by the differential signals through the TMDS channels #0, #1, and #2. The recovery decoders also respectively convert the image data, the auxiliary data, and the control data from serial data into parallel data. In FIG. 2, the video data are sent to the video decoder 230, and the audio data are sent to the audio decoder 260, both the video data and the audio data being decoded by the respective decoders. The 3-D information that was extracted from the second area and transmitted from the HDMI transmission portion 130 in the TMDS format is also decoded by the video decoder 230.

The adaptation field 3-D information that is sent through the CEC line 420 is received by the transmission/receiving portion 220. The television receiver 200 controls its own functions based on the adaptation field 3-D information that is received by the transmission/receiving portion 220 and the video field 3-D information that is received by the HDMI receiving portion 210.

The adaptation field 3-D information is sent to a CPU 280. Based on the adaptation field 3-D information, the CPU 280 controls the various structural elements, such as the video decoder 230, the 3-D processor 240, the LCD panel block 250, and the like. For example, the CPU 280 controls the various structural elements, such as the video decoder 230, the 3-D processor 240, the LCD panel block 250, and the like in a case where the switching from 3-D to 2-D, or from 2-D to 3-D, is performed based on the adaptation field 3-D information. The video decoder 230 switches the functions according to whether the image data that have been sent from the disc recorder 100 are three-dimensional images or two-dimensional images and decodes the video signal. The 3-D processor 240 performs the processing that is necessary in order to allow the LCD panel block 250 to perform the three-dimensional or two-dimensional display appropriately. The LCD panel block 250 performs the displaying of the video as one of a three-dimensional display and a two-dimensional display. The audio decoder 260 sends the decoded audio information to the speaker 270, and the speaker 270 outputs the audio in accordance with the audio information.

Based on the transition_time that is included in the adaptation field 3-D information, the CPU 280 controls the timing of the switching between 3-D and 2-D. Based on the version_number that is included in the adaptation field 3-D information, the CPU 280 detects whether the adaptation field 3-D information has been updated and determines whether or not to perform the switching between 3-D and 2-D. Based on the three_dimension_format and the three_dimension_sub_format, the CPU 280 sets the three-dimensional display format, and based on the format, it controls the various structural elements, such as the video decoder 230, the 3-D processor 240, the LCD panel block 250, the audio decoder 260, and the like.

The video decoder 230, when it receives the video data, extracts the video field 3-D information that is included in the video data and changes its control based on the video field 3-D information. For example, based on the three_dimension_format, the video decoder 230 performs processing that changes the three-dimensional display format setting. The video field 3-D information that has been extracted by the video decoder 230 is sent to the CPU 280. Based on the video field 3-D information, the CPU 280 controls the various structural elements, such as the 3-D processor 240, the LCD panel block 250, the audio decoder 260, and the like.

In a case where the video decoder 230 can directly switch the decoding processing based on the received information in Table 2, that is, in a case where the television receiver 200 is a device that is capable of high-speed switching, the video decoder 230 switches its own functions based on the received 3-D information. Furthermore, in a case where the television receiver 200 is a device that is capable of high-speed switching, the video decoder 230 passes the 3-D information data directly to the 3-D processor 240. In that case, the 3-D processor 240 can perform the three-dimensional display processing automatically.

In the television receiver 200 of the present embodiment that is configured as described above, the video decoder 230 and the CPU 280 have functions that receive the three-dimensional display information in Table 1 and Table 2 that pertains to the three-dimensional display. The video decoder 230 and the CPU 280 also have functions that, based on the three-dimensional display information, control the video display processing in accordance with the video signal in the digital broadcast signal.

(6) Effect of Inserting 3-D Information

In the present embodiment, the information in the second area is transmitted using the packet called the InfoFrame that is transmitted together with the image data. However, transmitting all of the information at the same time as the image data packet that is ordinarily used places an excessive burden on the hardware and software, giving rise to an increase in the number of gates and clock frequencies and likely leading to an increase in the cost. In the present embodiment, the information (the information in the second area) that requires instantaneous execution in synchronization with the image data is transmitted in HDMI by superimposing it on the TMDS signal. In a case where it is acceptable for the transition to take some time, the information (the information in the first area) is transmitted through an auxiliary communication path such as the CEC line 420 or the like. The burden can thus be reduced. To put it another way, the source device transmits the information in the first area and the information in the second area in parallel as packets that are transmitted through the TMDS channels #0, #1, and #2 and as commands that are transmitted through the CEC line 420, and the sink device receives the information that is transmitted in parallel. This makes it possible to keep to a minimum the packets of the information that pertains to three-dimensional display and two-dimensional display, particularly those that are sent together with the video data.

Furthermore, as stated previously, the known technology does not have a mechanism for sending the information that pertains to three-dimensional images and two-dimensional images, so it is not possible for the receiving device to automatically determine whether an image is a three-dimensional image or a two-dimensional image and to display it accordingly. In this case, the functions for distinguishing between three-dimensional images and two-dimensional images that it is conceivable that a broadcasting entity that provides content might expect the television receiver 200 to have include, for example, those that are described in (A) to (D) below. In the present embodiment, each of the cases (A) to (D) can be handled by inserting the 3-D information that is described above into two locations within the digital broadcast signal.

(A) At the broadcasting station (in the transmission device 300) that provides the content, there are cases where the content is switched from 3-D to 2-D, and vice-versa, even while the three-dimensional content is being broadcast. One example of this would be where commercial message (CM) content is inserted while the three-dimensional content is being broadcast. In a case where the CM is three-dimensional, the display of the three-dimensional content continues, so there is no need to change the display, but the CM is normally produced for the two-dimensional display format, so it is difficult to convert the CM content that is sent from the provider of the CM into three-dimensional content and to send it to the disc recorder 100. Therefore, when the shift is made to the CM in the middle of the transmitting of the three-dimensional content, it is desirable for information on the point where the change is made from 3-D to 2-D (time information on the timing of the change and the like) to be inserted into the 3-D information that is transmitted from the broadcasting side, thus making it possible for the receiving device to automatically determine the switch from 3-D to 2-D and automatically change the display format. Then, when the CM is finished, in order to turn to the three-dimensional display, it is necessary to provide information to the receiving device about the point where the change is made from the two-dimensional display to the three-dimensional display.

(B) It is also desirable for the receiving device to have a function that can switch the display instantaneously from 3-D to 2-D, and from 2-D to 3-D, but a case can be assumed in which it is difficult to handle this sort of high-speed switching due to the structure of the receiving device (the television receiver 200). In this case, it is conceivable that the switching might require a certain amount of time. In that case, if information on the switching between 3-D and 2-D is only inserted at the point (the timing) where the content is switched, it can be assumed that the switching in the television receiver 200 might not be performed at the time that is expected on the broadcasting side. It can also be assumed that the switching in the television receiver 200 might be performed later than is expected on the broadcasting side. If the switching in the television receiver 200 is performed later than is assumed on the broadcasting side, it can be assumed that the portion of the content that begins immediately after the switch will not be displayed properly.

With regard to the examples (A) and (B) that are described above, the CM image is ordinarily treated as important, so it is desirable for the functioning of the television receiver 200 to be reliably switched from the three-dimensional display function to the two-dimensional display function at the time when the beginning of the CM is to be displayed. As described previously, the function of the video decoder 230 can be switched directly by using the information in Table 2, so the television receiver 200 that is capable of performing the instantaneous switching of the display between 3-D and 2-D uses the information in Table 2 to control the switching.

In the television receiver 200 in which a certain amount of time is required for the transition of the display switching, the CPU 280 uses the information in the transition_type, the transition_timing, and the transition_time in Table 1 to perform control such that the switching processing is completed before the transition occurs. In order to ensure that the display switching in the television receiver 200 in which a certain amount of time is required for the transition of the display switching is actually performed at the time that the transmitting side expects, the transmission device 300 transmits to the television receiver 200 information that designates a switching point that is prior to the switching time. This makes it possible to reliably avoid a situation in which the data at the beginning of the content are missing when the switch is made. In this case, the transmission device 300 sets the information such that the television receiver 200 that requires time for the transition will perform the desired operation in accordance with the information in the transition_type, the transition_timing, and the transition_time. Note that with respect to the time setting, it is desirable for the desired information to be set such that a large number or receiving devices can make the transition. The transition_timing in Table 1 is counted from the time when the information is first received. In some cases, the information will be received a plurality of times before the transition is completed, but the count value is not reset. It is also possible to count the time for the transition_time on the transmitting side and to insert it into the information.

Furthermore, as mentioned previously, it is also possible to designate the switching time inserting the absolute time information of the PCR as the transition_time. In this case, the disc recorder 100 can perform the transition based on the time that is designated by the PCR.

(C) There are also cases in which it is necessary for the transmitting side to display highly urgent information, in the form of superimposed characters or the like, even while the 3-D content is being transmitted. An example of a case like this is the transmitting of information about an earthquake or the like in the form of superimposed characters. In this case, it is acceptable if the character information can be displayed three-dimensionally, but it can be assumed that it is difficult to insert superimposed three-dimensional characters into three-dimensional content and that the characters that are thus inserted will appear to be doubled, making them difficult for the user to read.

In the present embodiment, in case (C), setting the display_control information in Table 1 makes it possible for the disc recorder 100 to control the switching from the three-dimensional display to the two-dimensional display, and also makes it possible to control the canceling of the switching. Thus, in the present embodiment, it is possible, even while the three-dimensional content is being transmitted, to insert information into the 3-D information to the effect that the superimposed characters will be displayed two-dimensionally, so that they can be viewed properly. It is also possible for the television receiver 200 to switch automatically to the two-dimensional display based on that information.

Note that the display_control information does not appear in Table 2, but this is due to the fact that the information in Table 2 is information that is inserted into the original video content. In a use case like case (C), the information is not inserted into the video content, because the purpose is to force the originally three-dimensional content to be displayed two-dimensionally for a special use such as emergency information or the like, so the display is controlled using only the information in Table 1. This makes it possible for the transmission device 300 to transmit extremely detailed information and to control the display on the television receiver 200 in a flexible manner.

(D) Information that indicates what format the three-dimensional content is using as the three-dimensional display format is also required in order for the display to be performed properly by the disc recorder 100. For example, in a case where the three-dimensional display format is the side-by-side format, information to that effect is inserted into the 3-D information. This makes it possible for the disc recorder 100 to perform the decoding processing properly based on the information that is transmitted about the three-dimensional display format.

Basically, receiving the three_dimension_format and the three_dimension_sub_format that are set in the 3-D information in Table 1 and Table 2 makes it possible for the television receiver 200 to determine the three-dimensional display format correctly and to perform the image processing properly. Note that the same information is inserted into the two locations of Table 1 and Table 2, but the television receiver 200 may perform the processing based on the information in either one of the locations.

As explained previously, inserting the information in Table 1 and Table 2 into the two areas in the digital broadcast signal makes it possible for the disc recorder 100 to implement the desired operations in the cases (A) to (D) above. Inserting the information that pertains to the three-dimensional display into the broadcast format of the digital broadcast makes it possible to provide the required information to the receiving side and to implement the desired functions on the receiving side. Note that the present embodiment has been explained using the transport stream as the only example, but as long as the information in Table 1 and Table 2 can be inserted, the transmission format that is used as the format for transmitting the digital broadcast is not limited to this example. MPEG2 video has been used as the compressed video format, but it is possible to apply the present invention to all compression formats into which the information that is defined here can be inserted, including video formats such as H.264 or the like.

2. Second Embodiment (1) Configuration of System According to the Present Embodiment FIG. 5 is a schematic drawing that shows an example of a system configuration according to a second embodiment. The basic configuration of the system according to the second embodiment is the same as in the first embodiment. In the system according to the second embodiment, an input portion 290 is provided in the television receiver 200. Commands are input by the user to the input portion 290. The input portion 290 is a structural element such as a switch, a mouse, a keyboard, or the like that is provided in the television receiver 200. The input portion 290 may also be a portion to which is input a signal that is transmitted from a remote controller.

When a command is input to the input portion 290 by the user, the command is sent through the CEC line 420, which is a bidirectional transmission path, to the transmission/receiving portion 140 of the disc recorder 100 as a control signal that controls the disc recorder 100. The control signal is sent from the transmission/receiving portion 140 to the CPU 180 of the disc recorder 100. Based on the control signal, the CPU 180 controls the various functions of the disc recorder 100.

As one example, even if the content that is being broadcast is three-dimensional content, the user might request to watch it in the ordinary two-dimensional display, because continuously watching a video in 3-D may make the user's eyes tired, for example. It can also be assumed that there will be cases in which, for other reasons, the user who is watching a video of program content or the like on the television receiver 200 will prefer to watch the three-dimensional video content in a two-dimensional display. In this sort of case, the user uses the input portion 290 to input a command to watch the video in a two-dimensional display. By a command of the CPU 280, the signal that is generated based on the command that has been input is sent from the transmission/receiving portion 220, through the CEC line 420, to the transmission/receiving portion 140 of the disc recorder 100, from which it is sent to the CPU 180.

In a case where the disc recorder 100 has received two-dimensional images along with three-dimensional images from the transmission device 300, the disc recorder 100, under the control of the CPU 180, transmits the two-dimensional images to the television receiver 200 instead of the three-dimensional images. Alternatively, the disc recorder 100, under the control of the CPU 180, may control the HDMI transmission portion 130 such that one of only the left eye images and only the right eye images that configure the three-dimensional images are sent to the television receiver 200. Thus one of only the left eye images and only the right eye images are sent to the television receiver 200. Therefore, the user who watches the video on the television receiver 200 can watch a two-dimensional video. Under the control of the CPU 180, the disc recorder 100 may also combine the three-dimensional left and right images to create the two-dimensional images, then send the two-dimensional images to the television receiver 200.

In a case where the side-by-side format that was described previously is used, for example, the two-dimensional display can be implemented on the television receiver 200 by selecting one of a left channel signal (a left eye signal) and a right side signal (a right eye signal) and transmitting the selected signal. It is also possible to designate that the video is to be watched in a two-dimensional display by designating on the transmitting side whether the left eye image (L) should be displayed or the right eye image (R) should be displayed.

The user can also use the input portion 290 to input desired information in the same manner. For example, the user can use the input portion 290 to input information that pertains to a position in the depth dimension of the three-dimensional image (the amount by which the image appears to project outward). When the information that pertains to the position in the depth dimension of the three-dimensional image is sent from the television receiver 200, the CPU 180 of the disc recorder 100 adjusts the parallax between the left eye image and the right eye image in accordance with the information. For example, in a case where a command is input to the input portion 290 to the effect that the user wants to increase the amount by which the image appears to project outward, the HDMI transmission portion 130, based on a command from the CPU 180, adjusts the left and right images such that the parallax between the left and right images becomes greater. Conversely, in a case where a command is input to the input portion 290 to the effect that the user wants to decrease the amount by which the image appears to project outward, the HDMI transmission portion 130, based on a command from the CPU 180, adjusts the left and right images such that the parallax between the left and right images becomes smaller.

In addition, in a case where the user desires to give priority to recognizing a display of superimposed characters, for example, as well as in a case where the user does not desire that the superimposed characters be recognized, the user can make settings on the disc recorder 100 in accordance with his desires by inputting commands through the input portion 290.

According to the second embodiment that has been explained above, changing the data that are sent from the disc recorder 100, based on the information that is input to the television receiver 200, makes it possible to cause the television receiver 200 to receive the desired information.

The preferred embodiments of the present invention have been explained in detail above with reference to the attached drawings, but the present invention is not limited to these examples. It should be understood by those possessing ordinary knowledge of the technical field of the present invention that various types of modified examples and revised examples are clearly conceivable within the scope of the technical concepts that are described in the appended claims, and that these modified examples and revised examples are obviously within the technical scope of the present invention.

What is claimed is:

1. A transmission device, comprising:
a video signal receiving portion that receives video data for one of a three-dimensional display and a two-dimensional display;
a first transmission portion that transmits the video data and a display information that pertains to (i) one of the three-dimensional display and the two-dimensional display of the video data, in which the display information that pertains to pre-display processing of the three-dimensional display of three-dimensional content in form of three-dimensional images is transmitted only when the video data being received is three-dimensional content to be displayed, and (ii) switching display of images of the three-dimensional images of the video data from three-dimensional image display format to two-dimensional image display format and from the two-dimensional image display format to the three-dimensional image display format, to a receiving device through a transmission path; and
a second transmission portion that transmits, when the video data being transmitted is the three-dimensional content in the form of the three-dimensional images, the display information to the receiving device through a bidirectional communication path that is configured using a specified line of the transmission path, wherein the specified line is other than a first communication path of the transmission path through which the first transmission portion transmits the video data and the display information to the receiving device,
wherein transmission of the display information by the first transmission portion and the second transmission portion is in accordance with a determination of in which of a first area and a second area in digital broadcast data the display information is located, the first area being different from the second area.

2. The transmission device according to claim 1,
wherein the first transmission portion transmits the video data and the display information through the transmission path in a form of differential signals in a plurality of channels.

3. The transmission device according to claim 1,
wherein the first transmission portion transmits the display information to the receiving device by inserting the display information into a blanking interval in the video data.

4. The transmission device according to claim 1, further comprising:
a display information receiving portion that receives the display information from a digital broadcast signal that is transmitted from a broadcasting station,
wherein the display information receiving portion receives the display information from one of a system data area and a video data area of the digital broadcast signal.

5. The transmission device according to claim 4,
wherein the first transmission portion transmits to the receiving device the display information that the display information receiving portion has received from the video data area.

6. The transmission device according to claim 4,
wherein the second transmission portion transmits to the receiving device the display information that the display information receiving portion has received from the system data area.

7. The transmission device according to claim 1,
wherein the display information includes one of information for displaying a three-dimensional image as a two-dimensional image, information that pertains to one of timing for a switch from a three-dimensional image to a two-dimensional image and timing for a switch from a two-dimensional image to a three-dimensional image, and format information about a three-dimensional image format.

8. The transmission device according to claim 1, further comprising:
a receiving portion that receives from the receiving device a control signal that is input by a user; and
a control portion that, based on the control signal, controls the video data that are transmitted from the first transmission portion.

9. The transmission device according to claim 8,
wherein the control portion switches the video data to one of a three-dimensional image and a two-dimensional image based on the control signal.

10. The transmission device according to claim 8,
wherein the control portion, in a case where the video data are a three-dimensional image, modifies a parallax between a left image and a right image based on the control signal.

11. A receiving device, comprising:
a first receiving portion that receives, from a transmission device that is connected to the receiving device through a transmission path, video data for one of a three-dimensional display and a two-dimensional display and a display information that pertains to (i) one of the three-dimensional display and the two-dimensional display of the video data, in which the display information that pertains to pre-display processing of the three-dimensional display of three-dimensional content in form of three-dimensional images is transmitted only when the video data being received is three-dimensional content to be displayed, and (ii) switching display of images of the three-dimensional images of the video data from three-dimensional image display format to two-dimensional image display format and from the two-dimensional image display format to the three-dimensional image display format;
a second receiving portion that receives, when the video data being received is the three-dimensional content in the form of the three-dimensional images, the display information from the transmission device through a bidirectional communication path that is configured using a specified line of the transmission path, wherein the specified line is other than a first communication path of the transmission path through which the video data and the display information from the transmission device is received by the first receiving portion,
wherein the display information from the transmission device is received by the first receiving portion and the second receiving portion in accordance with a determination of in which of a first area and a second area in digital broadcast data the display information is located, the first area being different from the second area; and
a control portion that, based on the display information, controls video display processing in accordance with the video data.

12. The receiving device according to claim 11,
wherein the first receiving portion receives the video data and the display information through the transmission path in a form of differential signals in a plurality of channels.

13. The receiving device according to claim 11,
wherein the control portion includes a decoder that decodes the video data, and the decoder controls decoding processing based on the display information that the first receiving portion has received along with the video data.

14. The receiving device according to claim 11,
wherein the display information includes one of information for displaying a three-dimensional image as a two-dimensional image, information that pertains to one of timing for a switch from a three-dimensional image to a two-dimensional image and timing for a switch from a two-dimensional image to a three-dimensional image, and format information about a three-dimensional image format.

15. The receiving device according to claim 11, further comprising:
an input portion through which a command is input by a user; and
a transmission portion that transmits, to the transmission device through the bidirectional communication path, a control signal in accordance with the command in order to control the transmission device.

16. The receiving device according to claim 15,
wherein the control signal is a signal for switching the video data in the transmission device to one of a three-dimensional image and a two-dimensional image.

17. The receiving device according to claim 15,
wherein the control signal is a signal for modifying a parallax between a left image and a right image in a case where the video data are a three-dimensional image.

18. A non-transitory recording medium on which is recorded a program that causes a computer to function as:
a portion that receives video data for one of a three-dimensional display and a two-dimensional display;
a first portion that transmits the video data and a display information that pertains to (i) one of the three-dimensional display and the two-dimensional display of the video data, in which the display information that pertains to pre-display processing of the three-dimensional display of three-dimensional content in form of three-dimensional images is transmitted only when the video data being received is three-dimensional content to be displayed, and (ii) switching display of images of the three-dimensional images of the video data from three-dimensional image display format to two-dimensional image display format and from the two-dimensional image display format to the three-dimensional image display format, to a receiving device through a transmission path; and
a second portion that transmits, when the video data being transmitted is the three-dimensional content in the form of the three-dimensional images, the display information to the receiving device through a bidirectional communication path that is configured using a specified line of the transmission path,
wherein the specified line is other than a first communication path of the transmission path through which the video data and the display information is transmitted to the receiving device,
wherein transmission of the display information by the first portion and the second portion is in accordance with a determination in which of a first area and a second area in digital broadcast data the display information is located, the first area being different from the second area.

19. A non-transitory recording medium on which is recorded a program that causes a computer to function as:
a first portion that receives, from a transmission device that is connected to the computer through a transmission path, video data for one of a three-dimensional display and a two-dimensional display and a display information that pertains to (i) one of the three-dimensional display and the two-dimensional display of the video data, in which the display information that pertains to pre-display processing of the three-dimensional display of three-dimensional content in form of three-dimensional images is transmitted only when the video data being received is three-dimensional content to be displayed, and (ii) switching display of images of the three-dimensional images of the video data from three-dimensional image display format to two-dimensional image display format and from the two-dimensional image display format to the three-dimensional image display format;

a second portion that receives, when the video data being received is the three-dimensional content in the form of the three-dimensional images, the display information from the transmission device through a bidirectional communication path that is configured using a specified line of the transmission path, wherein the specified line is other than a first communication path of the transmission path through which the video data and the display information from the transmission device is received, wherein the display information from the transmission device is received by the first portion and the second portion in accordance with a determination of in which of a first area and a second area in digital broadcast data the display information is located, the first area being different from the second area; and a portion that, based on the display information, controls video display processing in accordance with the video data.

20. A communication system, comprising:

a transmission device that includes a video signal receiving portion that receives video data for one of a three-dimensional display and a two-dimensional display, a first transmission portion that transmits the video data and a display information that pertains to (i) one of the three-dimensional display and the two-dimensional display of the video data, in which the display information that pertains to pre-display processing of the three-dimensional display of three-dimensional content in form of three-dimensional images is transmitted only when the video data being received is three-dimensional content to be displayed, and (ii) switching display of images of the three-dimensional images of the video data from three-dimensional image display format to two-dimensional image display format and from the two-dimensional image display format to the three-dimensional image display format, to a receiving device through a transmission path, and a second transmission portion that transmits, when the video data being transmitted is the three-dimensional content in the form of the three-dimensional images, the display information to the receiving device through a bidirectional communication path that is configured using a specified line of the transmission path, wherein the specified line is other than a first communication path of the transmission path through which the first transmission portion transmits the video data and the display information to the receiving device, wherein transmission of the display information by the first transmission portion and the second transmission portion is in accordance with a determination of in which of a first area and a second area in digital broadcast data the display information is located, the first area being different from the second area; and the receiving device, wherein the receiving device includes a first receiving portion that receives from the transmission device, to which the receiving device is connected through the transmission path, the video data and the display information that are transmitted from the first transmission portion, that includes a second receiving portion that receives from the transmission device, through the bidirectional communication path, the display information that is transmitted from the second transmission portion, and that includes a control portion that, based on the display information, controls video display processing in accordance with the video data.

21. The transmission device according to claim 1, wherein the first area is a system data area of a transport stream that is other than a header and the second area is of a header in a video data area.

* * * * *